(12) United States Patent
Rambach et al.

(10) Patent No.: US 7,898,467 B2
(45) Date of Patent: Mar. 1, 2011

(54) METHOD AND DEVICE FOR SIMULATING RADIO NAVIGATION INSTRUMENTS

(75) Inventors: Diane Rambach, Toulouse (FR); Pierre Durel, Toulouse (FR); Gilles Tatham, Colomiers (FR)

(73) Assignee: AIRBUS France, Toulouse (FR)

( * ) Notice: Subject to any disclaimer, the term of this patent is extended or adjusted under 35 U.S.C. 154(b) by 259 days.

(21) Appl. No.: 12/144,094

(22) Filed: Jun. 23, 2008

(65) Prior Publication Data

US 2009/0066560 A1    Mar. 12, 2009

(30) Foreign Application Priority Data

Jun. 22, 2007   (FR)   ................. 07 55963

(51) Int. Cl.
*G01C 21/00* (2006.01)
*G01S 13/00* (2006.01)

(52) U.S. Cl. ............... 342/169; 342/29; 342/36; 342/37; 701/213; 701/218

(58) Field of Classification Search ......... 342/29–32, 342/36–40, 42–51, 169; 701/213, 218
See application file for complete search history.

(56) References Cited

U.S. PATENT DOCUMENTS

| | | | | |
|---|---|---|---|---|
| 3,936,828 A | * | 2/1976 | Muesse et al. | 342/394 |
| 4,359,733 A | * | 11/1982 | O'Neill | 342/36 |
| 4,583,177 A | * | 4/1986 | Meyer | 701/218 |
| 4,918,610 A | * | 4/1990 | Becker | 701/218 |
| 5,099,245 A | * | 3/1992 | Sagey | 342/357.01 |
| 5,367,306 A | * | 11/1994 | Hollon et al. | 342/386 |
| 5,422,814 A | * | 6/1995 | Sprague et al. | 701/213 |
| 5,467,282 A | * | 11/1995 | Dennis | 701/215 |
| 5,499,032 A | * | 3/1996 | Kelley et al. | 342/463 |
| 5,627,546 A | * | 5/1997 | Crow | 342/352 |
| 5,714,948 A | * | 2/1998 | Farmakis et al. | 340/961 |
| 5,740,048 A | * | 4/1998 | Abel et al. | 701/200 |
| 5,801,659 A | * | 9/1998 | Helfrick | 342/357.08 |
| 5,957,995 A | * | 9/1999 | Beckmann et al. | 701/213 |
| 6,085,129 A | * | 7/2000 | Schardt et al. | 701/14 |

(Continued)

OTHER PUBLICATIONS

Steven D. Campbell, et al., "Flight Test Results for an Experimental GPS C/A-code Receiver in a General Aviation Aircraft", Navigation Journal of the Institute of Navigation, vol. 30, No. 4, XP-002043388, Sep. 1983, pp. 350-368.

*Primary Examiner*—Thomas H Tarcza
*Assistant Examiner*—Peter Bythrow
(74) *Attorney, Agent, or Firm*—Oblon, Spivak, McClelland, Maier & Neustadt, L.L.P.

(57) ABSTRACT

The device (405) for behavior simulation of a radio navigation system, without the latter being installed on an aircraft, comprising a means (410) for determining a position of the aircraft, characterized in that it further comprises:

a means (415) for automatically determining at least one radio navigation beacon of a station on the ground depending on said position of the aircraft, and for selecting a radio navigation beacon of an automatically determined station on the ground, a means (420) for calculating at least one physical quantity value linked to the relative position of the aircraft relative to the selected beacon and a means (425) for presenting, on a display means of the aircraft cockpit, each calculated physical quantity value and the identifier of the selected beacon.

19 Claims, 3 Drawing Sheets

U.S. PATENT DOCUMENTS

| | | | |
|---|---|---|---|
| 6,606,559 B1 * | 8/2003 | Beckmann et al. | 701/213 |
| 6,901,331 B1 * | 5/2005 | Beckmann et al. | 701/213 |
| 7,337,063 B1 * | 2/2008 | Oberg et al. | 701/213 |
| 7,428,450 B1 * | 9/2008 | Oberg | 701/4 |
| 7,548,196 B2 * | 6/2009 | Fagan et al. | 342/357.02 |
| 7,652,621 B2 * | 1/2010 | Jacotot | 342/357.01 |
| 2008/0252511 A1 * | 10/2008 | Jacotot | 342/47 |
| 2009/0066560 A1 * | 3/2009 | Rambach et al. | 342/169 |
| 2010/0001895 A1 * | 1/2010 | Leeson | 342/36 |

* cited by examiner

METHOD AND DEVICE FOR SIMULATING RADIO NAVIGATION INSTRUMENTS

The present invention concerns a method and device for simulating radio navigation instruments. It applies, in particular, to simulating the behavior of a radio navigation system, in particular DME (acronym for "Distance Measuring Equipment"), ADF (acronym for "Automatic Direction Finder") and MKR (abbreviation for "marker"). The invention concerns, more generally, the field of radio navigation in the aircraft industry.

Among the radio navigation systems used in civil aviation are so-called "conventional" radio navigation systems based on radio frequency communication between a station on the ground, emitting its identifier as well as the information to process, and a moving aircraft.

Figure 1:
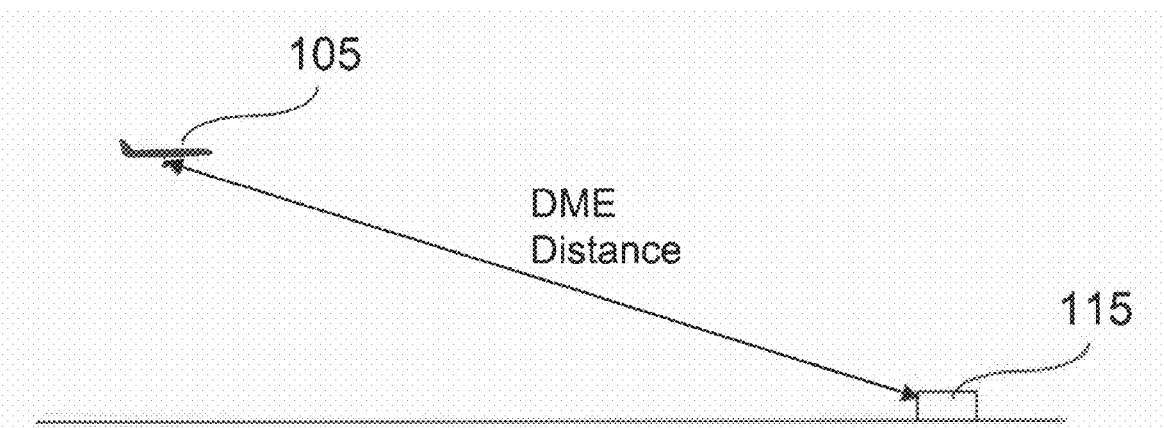

DME is a system which, by measuring the return time between the signal sent by the receiver installed on the aircraft and that sent back by a station on the ground, enables the direct distance between that same station on the ground and the moving aircraft to be known. The frequency band used to transmit the DME information as well as the identifier (series of 2 or 3 letters in Morse code) from the beacon on the ground is from 962 to 1213 MHz FIG. 1 is a diagram, viewed from the side, of a DME system. An aircraft 105 emits a signal which is, on reception, returned by a station on the ground 115. The DME determines the distance between the aircraft 105 and the station on the ground 115 on the basis of the time between the emission and the reception of the signal.

Figure 2:
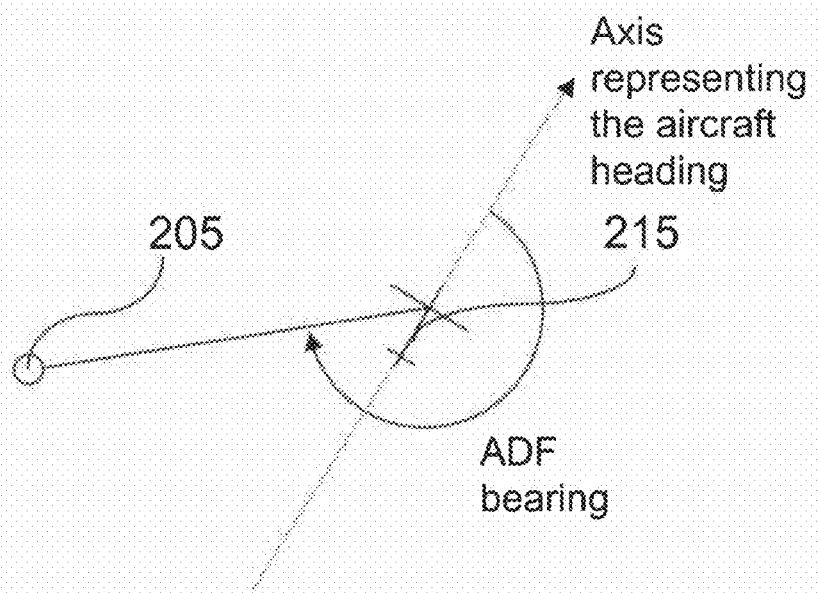

ADF is a system giving the bearing of the aircraft relative to a station on the ground. ADF gives the angle between the heading followed by the aircraft and the radial between the aircraft and the station on the ground. This is the oldest of the radio navigation systems (installed on civil aircraft since 1937). The frequency band used to transmit the ADF information as well as the identifier (series of 2 or 3 letters in Morse code) from the beacon on the ground goes from 190 to 1750 kHz FIG. 2 is a diagram, viewed from above, of an ADF system. The station on the ground 205 emits a signal which is picked up by the aircraft 215. The ADF of the aircraft 215 determines the angle between the line of propagation of the signal and the heading followed by the aircraft 215.

Figure 3:
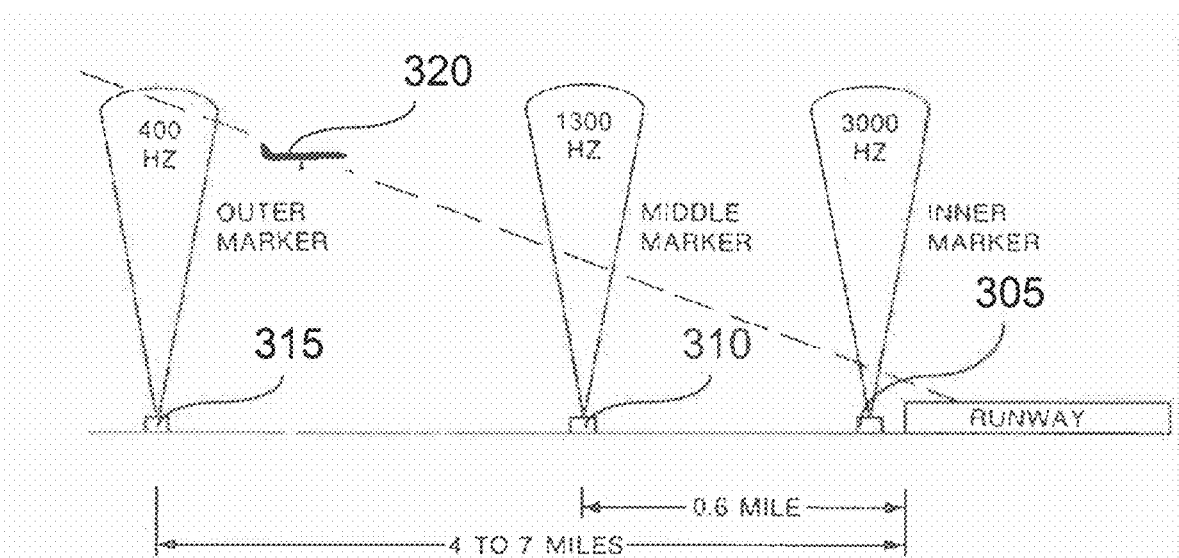

The marker system informs the pilot when the aircraft 320 flies over one of the beacons on the ground, termed "marker", during an ILS approach (ILS being an acronym for "Instrument Landing System"). As illustrated in FIG. 3, these radio beacons are: the Inner Marker 305 (situated at the foot of the runway), the Middle Marker 310 (situated from 0.5 to 0.8 nautical miles from the runway), and the Outer Marker 315 (situated from 4 to 7 nautical miles from the threshold of the runway). 75 MHz is the frequency used by the Marker beacon.

On designing an aircraft, the optimization of the number of on-board systems enables mass and volume saving. More particularly, removing a system not only enables mass to be saved (weight of the computer, antennae and cables for radio navigation equipment) but also volume, since spaces are reserved for each of the systems, at the time of the installation in each avionics bay. This also makes it possible to reduce non-recurring costs, costs relative to the development of a piece of equipment (time and staff reserved for the development of the system, drafting of specification documents, interfaces with subscriber systems, security, installation on the aircraft, etc.).

Furthermore, ADF, DME and Marker form part of the conventional navigation systems, based on the communication between a station on the ground forming a reference frame and the moving aircraft.

The ICAO (acronym for "International Civil Aviation Organization") recommend for future years to use navigation systems based on satellite constellations, for example of GPS type (GPS being an acronym for "Global Positioning System") or GALILEO, rather than based on systems using stations on the ground, this making it possible to reduce the maintenance costs relative to the latter.

Although GPS receivers are installed on most aircraft of the applicant's fleet, conventional radio navigation systems (VOR, ADF, DME, etc.) are still used for some phases of flight.

The aircraft currently developed must take into account the recommendations of the ICAO to base their navigation means on satellite systems, but also the operational needs to fly according to certain procedures based on so-called "conventional" radio navigation means.

The present invention is directed, in particular, to keeping this radio navigation information available, without installing a receiver on the aircraft.

To that end, according to a first aspect, the present invention concerns a device for behavior simulation of a radio navigation system, without the latter being installed on an aircraft, comprising a means for determining a position of the aircraft, characterized in that it further comprises:

- a means for automatically determining at least one radio navigation beacon of a station on the ground depending on said position of the aircraft, and for selecting a radio navigation beacon of an automatically determined station on the ground,
- a means for calculating at least one physical quantity value linked to the relative position of the aircraft relative to the selected beacon and
- a means for presenting, on a display means of the aircraft cockpit, each calculated physical quantity value and the identifier of the selected beacon.

By virtue of these provisions, although the acquisition of the radio navigation signal is no longer carried out, the crew has information available in the cockpit that simulates the results which would have been obtained on the basis of radio navigation signals.

According to particular features, the means for automatically determining and for selecting is adapted to determine at least one beacon depending on the type of aircraft in which the device is present.

According to particular features, the means for automatically determining and for selecting is adapted to determine at least one beacon depending on the phase of flight in which the aircraft in which the device is present is in.

According to particular features, the means for automatically determining and for selecting is adapted to determine said phase of flight depending on the position of the aircraft in which the device is present.

According to particular features, the means for automatically determining and for selecting is adapted to determine said phase of flight depending on the type of aircraft in which the device is present.

According to particular features, the means for automatically determining and for selecting is adapted, during the flight between two beacons, to select the beacon which is closest to the axis of flight of the aircraft.

According to particular features, the means for automatically determining and for selecting is adapted, during an approach phase, to select the closest beacon to an airdrome of sufficient category to receive the aircraft in which the device is present.

According to particular features, the means for automatically determining and for selecting is adapted to supply, to a crew member, a limited list of the ground stations of which the signals could have been captured by a radio navigation receiver, if the aircraft had been equipped therewith.

According to particular features, the means for automatically determining and for selecting is adapted to supply, to a crew member, a limited list of the stations on the ground and to enable the crew member to select a station in said list.

According to particular features, the means for determining the position of the aircraft uses at least one signal from a satellite.

According to particular features, the calculating means retrieves, from a database, position information of the selected beacon.

According to particular features, the presenting means is adapted to provide the physical quantity value to a display device of a DME (DME being an acronym for "Distance Measuring Equipment"), ADF (acronym for "Automatic Direction Finder") or MKR (abbreviation for "marker") system.

According to particular features, the means for calculating radio navigation information is adapted to calculate the direct distance between the selected beacon and the aircraft.

According to particular features, the means for calculating radio navigation information is adapted to calculate the angle between the heading of the aircraft and the radial formed by the aircraft relative to the selected beacon.

According to particular features, the means for calculating radio navigation information is adapted to determine whether the aircraft is flying over the selected beacon.

According to particular features, the calculating means is adapted use Sodano equations.

According to a second aspect, the present invention concerns a method of behavior simulation of a radio navigation system, without the radio navigation system being installed on an aircraft, comprising a step of determining a position of the aircraft, characterized in that it further comprises:
- a step of automatically determining at least one radio navigation beacon of a station on the ground depending on said position of the aircraft, and of selecting a radio navigation beacon of an automatically determined station on the ground,
- a step of calculating at least one physical quantity value linked to the relative position of the aircraft relative to said beacon and
- a step of presenting, on a display means of the aircraft cockpit, each calculated physical quantity value and the identifier of the selected beacon.

As the particular objects and features of this method are similar to those of the device of the present invention, as succinctly set forth above, they are not reviewed here.

Figure 5:
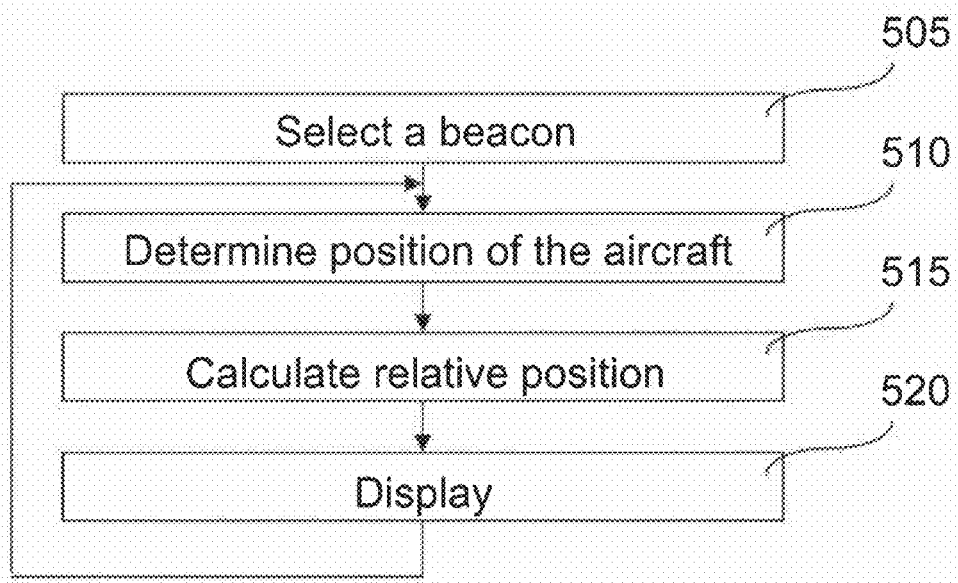
Figure 4:
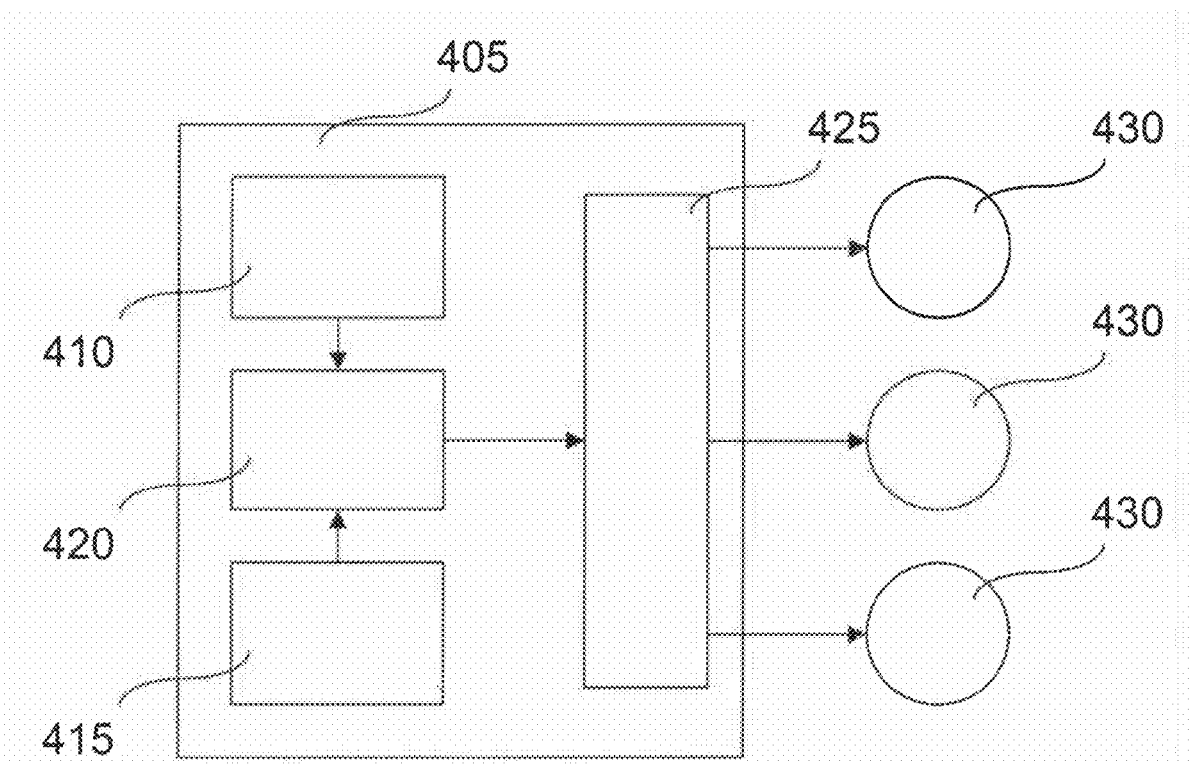

Other advantages, objects and features of the present invention will emerge from the following description, given, with an explanatory purpose that is in no way limiting, with reference to the accompanying drawings, in which:

FIGS. 1 to 3 are diagrammatic side views of the radio navigation systems known to the person skilled in the art, FIG. 4 is a diagram of a particular embodiment of the device of the present invention and FIG. 5 represents, in logigram form, steps of a particular embodiment of the method of the present invention.

FIGS. 1 to 3 have already been described with reference to the problems of the prior art.

In FIG. 4, a device 405 can be seen installed in an aircraft comprising a cockpit provided with display means 430. The device 405 comprises:
- a means 410 for determining the position of the aircraft,
- a means 415 for selecting a radio navigation beacon of a station on the ground,
- a means 420 for calculating at least one physical quantity value linked to the relative position of the aircraft relative to said beacon and
- a means 425 for presenting each calculated physical quantity value and the identifier of the beacon on a display means 430 of the cockpit.

In some embodiments, the means 410 for determining the position of the aircraft uses at least one signal from a satellite. The means 410 is, for example, constituted by a means for receiving GNSS signals, for example GPS or Galileo. On the basis of these signals, the means 410 determines, in particular by triangulation, the position of the aircraft, in latitude, longitude and altitude and, by analysis of the successive positions of the aircraft or by Doppler effects, and the direction of movement of the aircraft. The heading followed by the aircraft is provided by an inertial unit, for example.

In some embodiments, the selecting means 415 is a graphical interface displayed on a matrix display which enables a member of the aircraft crew to select a radio navigation beacon from a database of beacons or of stations on the ground. For example, in the database, each station on the ground or each associated beacon is identified by its universal identifier, an explicit name and its coordinates in latitude, longitude and altitude.

In some embodiments, the selecting means 415 is automatic and, depending on the position of the aircraft and on its type (airliner, private aircraft or tourist aircraft), determines the flight phase of the aircraft (take off, flight between two beacons, approach or landing) and, depending on the position of the aircraft, on its type and on the flight phase, the beacon serving as reference during that flight phase. For example, during the flight between two beacons, the beacon which is located the closest to the axis of flight of the aircraft is automatically selected. It is noted that proximity may be determined in terms of distance or in terms of angle seen from the aircraft. On the other hand, during an approach phase, the closest beacon to an airdrome of sufficient category to receive the aircraft is automatically selected.

The automatic beacon selection may be carried out according to rules which depend on the route followed by the aircraft, on the beacons installed on that route and on geometric criteria (thus among others, the aircraft position and the flight phase). The two rules identified above are thus merely examples. Different rules may be managed by using priorities, for example with the proximity of the aircraft to the beacon as a principle. This automatic beacon selection may differ from one type of aircraft to another. It is to be noted that the device indicates each change of selected beacon visually or by audio.

The flight phases may be calculated by logic based on different information such as the position (altitude, distance to destination) and the information entered by the pilot. The management of the flight phases may differ from one type of aircraft to another.

When the pilot prepares his flight plan, he defines the destination airport which is of sufficient category to receive the aircraft he pilots. It is thus on the basis of the information entered by the pilot that the information concerning the capacity of an airport to receive the aircraft is obtained. It may be noted that the pilot may select a Navaid frequency (VOR, TACAN, DME, MKR, etc.), identification information, for example the three letters associated with the main ground stations, a point on the route, a landmark or another intermediate destination.

The DME, ADF or MKR operating mode is chosen depending on the type of beacon selected, that is to say respectively DME, NDB or MKR.

In some embodiments, the crew member also selects the data he wishes to see displayed on the display means 430, for example direct distance, bearing and/or passage above a marker approach beacon.

In some embodiments, the means 415 provides, for example on request by a crew member entered into a graphical interface, a limited list of the ground stations of which the signals could have been captured by a radio navigation receiver, if the aircraft had been equipped therewith. In this limited list, the crew member selects the station which will serve as reference.

The calculating means 420 retrieves, from a database, the position information of the beacon selected by the selecting means and determines, for example by using the Sodano equations, which are well-known to the person skilled in the art, the relative positions of the aircraft and of the beacon, in the different frames of reference needed.

In particular, the calculating means 420 determines the direct distance of the aircraft and the selected beacon, the bearing made by the aircraft relative to the beacon on the ground, that is to say the angle between the heading followed by the aircraft and the radial between the aircraft and the station on the ground.

On the basis of an aircraft position (a,b,c), of GNSS type, with a corresponding to longitude, b to latitude and c to altitude, and a ground beacon position (x, y, z), with x as longitude, y as latitude and z as altitude, the calculating means 420 calculates the VOR bearing, the DME distance or the ADF bearing, using algorithms based on the fundamental principle of navigation (the Sodano equations, for example).

As regards the simulation of the marker beacons, with the database containing the position (x,y,z), of each of the approach beacons and their identification ("inner", "middle" or "outer"), depending on the position of the aircraft (a,b,c), comparison is made between the longitudes and latitudes (allowing for a slight uncertainty $\epsilon$), according to the following condition: the aircraft is above the beacon if $x-\epsilon \leq a \leq x+\epsilon$ and $y-\epsilon \leq b \leq y+\epsilon$.

The presentation means 425 supplies, to at least one display means, or display, 430, of the cockpit, the identifier of the beacon, obtained from the database, and the calculated data, which may be selected by the user as stated above, according to the display standards known for radio navigation systems.

Thus, the presenting means 425 is adapted to have displayed, by at least one display means 430, it being understood that at least two of these displays may be combined:

the distance, by a display simulating or implementing a DME system (DME being an acronym for "Distance Measuring Equipment"), the bearing, by a display simulating or implementing an ADF system (ADF being an acronym for "Automatic Direction Finder"), the passage above a marker approach beacon, by a display simulating or implementing a MKR system (MKR being an abbreviation of "marker"), the marker beacon concerned (inner, middle or outer) being identified.

In some embodiments, an audio signal is emitted in addition to displaying at least a part of the data stated above. In particular, the passage above a marker approach beacon is preferably signaled by an audio signal which is different for each of the markers considered.

In FIG. 5, it can be seen that the following steps are carried out in a particular embodiment of the method of the present invention: a step 505 of selecting a beacon, a step 510 of determining position, direction of movement and heading of the aircraft, a step 515 of calculating relative position of the aircraft and of the selected beacon on the basis of the aircraft position and the position of the beacon, and a step 520 of presenting the information calculated on a display means of the cockpit, as well as the identifier of the beacon. It is noted that the signals sent by the simulating system may have the same format as that used by the radio navigation systems known in the prior art, which enables it to be inserted into the environment of the aircraft already equipped with at least one radio navigation system part. In some embodiments, the signals are sent by the navigation system in another format, and/or onto another type of display. Further to step 520, step 510 is returned to, it being understood that, at any time, the selecting step 505 may be carried out.

By virtue of the implementation of the present invention, the behavior of a conventional radio navigation system (DME, MKR, ADF, etc.) is reproduced when a receiver of such a radio navigation system is not installed on an aircraft.

The invention claimed is:

1. A device for behavior simulation of a radio navigation system, without the radio navigation system being installed on an aircraft, the device comprising:
    a position determining unit configured to determine a position of the aircraft;
    a determining unit configured to automatically determine at least one radio navigation beacon of a station on the ground depending on said position of the aircraft, and a to select the radio navigation beacon of the automatically determined station on the ground;
    a calculating unit configured to calculate at least one physical quantity value linked to a relative position of the aircraft relative to the beacon selected by the determining unit; and
    a presenting unit configured to present, on a display device of the aircraft cockpit, the at least one physical quantity value calculated by the calculating unit and an identifier of the beacon selected by the determining unit.

2. A device according to claim 1, wherein the determining unit is configured to determine at least one beacon depending on a type of aircraft in which the device is present.

3. A device according to claim 1, wherein the determining unit is configured to determine at least one beacon depending on a current phase of flight of the aircraft in which the device is present.

4. A device according to claim 3, wherein the determining unit is configured to determine said phase of flight depending on the position of the aircraft in which the device is present.

5. A device according to claim 4, wherein the determining unit is configured to determine said phase of flight depending on a type of aircraft in which the device is present.

6. A device according to claim 3, wherein the determining unit is configured to determine said phase of flight depending on a type of aircraft in which the device is present.

7. A device according to claim 3, wherein the determining unit is configured to select, during the flight between two beacons, to the beacon which is closest to the axis of flight of the aircraft.

8. A device according to claim 3, wherein the determining unit is configured to select, during an approach phase, the closest beacon to an airdrome of sufficient category to receive the aircraft in which the device is present.

9. A device according to claim 1, wherein the determining unit is further configured to supply, to a crew member, a limited list of ground stations of which the signals could have been captured by a radio navigation receiver, if the aircraft had been equipped therewith.

10. A device according to claim 1, wherein the determining unit is further configured to supply, to a crew member, a limited list of stations on the ground and to enable the crew member to select a station in said list.

11. A device according to claim 1, wherein the position determining unit is further configured to determine the position of the aircraft using at least one signal from a satellite.

12. A device according to claim 1, wherein the calculating unit is further configured to retrieve, from a database, position information of the beacon selected by the determining unit.

13. A device according to claim 1, wherein the presenting unit is further configured to provide the physical quantity value to the display device of at least one of a DME (DME being an acronym for "Distance Measuring Equipment"), an ADF (acronym for "Automatic Direction Finder"), and an MKR (abbreviation for "marker") system.

14. A device according to claim 1, wherein the calculating unit is further configured to calculate a direct distance between the beacon selected by the determining unit and the aircraft.

15. A device according to claim 1, wherein the calculating unit is further configured to calculate an angle between a heading of the aircraft and a radial formed by the aircraft relative to the beacon selected by the determining unit.

16. A device according to claim 1, wherein the calculating unit is further configured to determine whether the aircraft is flying over the beacon selected by the determining unit.

17. A device according to claim 1, wherein the calculating unit is configured to use Sodano equations.

18. A method of behavior simulation of a radio navigation system, without the radio navigation system being installed on an aircraft, the method comprising:

determining a position of the aircraft;

automatically determining at least one radio navigation beacon of a station on the ground depending on said position of the aircraft;

selecting the radio navigation beacon of the automatically determined station on the ground;

calculating at least one physical quantity value linked to a relative position of the aircraft relative to said beacon selected by the selecting; and presenting, on a display device of the aircraft cockpit, the at least one physical quantity value calculated by the calculating and an identifier of the beacon selected by the selecting.

19. A device for behavior simulation of a radio navigation system, without the radio navigation system being installed on an aircraft, the device comprising:

a position determining unit configured to determine a position of the aircraft;

means for automatically determining at least one radio navigation beacon of a station on the ground depending on said position of the aircraft, and for selecting the radio navigation beacon of the automatically determined station on the ground;

means for calculating at least one physical quantity value based on a relative position of the aircraft relative to the beacon selected by the means for determining; and a presenting unit configured to present, on a display device of the aircraft cockpit, the at least one physical quantity value calculated by the means for calculating and an identifier of the beacon selected by the means for determining.

* * * * *